(12) United States Patent
Nekhamkin et al.

(10) Patent No.: US 8,068,563 B2
(45) Date of Patent: Nov. 29, 2011

(54) SYSTEMS AND METHODS FOR FREQUENCY OFFSET CORRECTION IN A DIGITAL RADIO BROADCAST RECEIVER

(75) Inventors: Michael Nekhamkin, Bridgewater, NJ (US); Sivakumar Thulasingam, Piscataway, NJ (US)

(73) Assignee: iBiquity Digital Corporation, Columbia, MD (US)

( * ) Notice: Subject to any disclaimer, the term of this patent is extended or adjusted under 35 U.S.C. 154(b) by 608 days.

(21) Appl. No.: 12/289,067

(22) Filed: Oct. 20, 2008

(65) Prior Publication Data

US 2010/0098195 A1    Apr. 22, 2010

(51) Int. Cl.
*H04L 27/14* (2006.01)
*H04L 27/16* (2006.01)
*H04L 27/22* (2006.01)

(52) U.S. Cl. ........ 375/326; 375/327; 375/344; 375/373; 375/375; 375/340; 455/102; 455/214; 455/258; 455/323

(58) Field of Classification Search .......... 375/325–327, 375/344, 340, 373, 375, 376; 455/102, 214, 455/258, 323
See application file for complete search history.

(56) References Cited

U.S. PATENT DOCUMENTS

| | | | |
|---|---|---|---|
| 6,178,317 B1 | 1/2001 | Kroeger et al. | |
| 6,549,544 B1 | 4/2003 | Kroeger et al. | |
| 6,563,880 B1 * | 5/2003 | Hunsinger et al. | 375/260 |
| 6,704,374 B1 | 3/2004 | Belotserkovsky et al. | |
| 6,807,241 B1 | 10/2004 | Milbar et al. | |
| 6,891,898 B2 | 5/2005 | Peyla et al. | |
| 7,221,917 B2 * | 5/2007 | Kroeger | 455/192.2 |
| 7,308,240 B2 | 12/2007 | Kishi | |
| 7,720,454 B1 * | 5/2010 | Clement et al. | 455/258 |
| 2005/0105657 A1 | 5/2005 | Kroeger et al. | |
| 2006/0050807 A1 | 3/2006 | Kroeger | |
| 2007/0110185 A1 | 5/2007 | Kroeger et al. | |
| 2007/0110186 A1 | 5/2007 | Kroeger et al. | |
| 2007/0287398 A1 * | 12/2007 | Mino | 455/214 |

* cited by examiner

*Primary Examiner* — Phuong Phu
(74) *Attorney, Agent, or Firm* — Jones Day

(57) ABSTRACT

Methods and systems for correcting a frequency error in a digital portion of a radio broadcast signal are disclosed. The methods and systems include the steps of receiving a radio broadcast signal having an analog portion and a digital portion, separating the analog portion of the radio broadcast signal and the digital portion of the radio broadcast signal, determining a coarse frequency offset of the analog portion of the radio broadcast signal, generating an error signal for adjusting a frequency of the digital portion of the radio broadcast signal, wherein the error signal is based on the coarse frequency offset of the analog portion of the radio broadcast signal, and adjusting the frequency of the digital portion of the radio broadcast signal with the error signal that is based on the coarse frequency offset of the analog portion of the radio broadcast signal, such that a frequency error in the digital portion of the radio broadcast signal is reduced below a predetermined amount.

24 Claims, 12 Drawing Sheets

FIG. 8

SYSTEMS AND METHODS FOR FREQUENCY OFFSET CORRECTION IN A DIGITAL RADIO BROADCAST RECEIVER

BACKGROUND

1. Field of the Disclosure

The present disclosure relates to radio broadcast receivers and, in particular, to methods and systems for frequency offset correction in a digital radio broadcast receiver.

2. Background Information

Digital radio broadcasting technology delivers digital audio and data services to mobile, portable, and fixed receivers. One type of digital radio broadcasting, referred to as in-band on-channel (IBOC) digital radio broadcasting, uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception.

IBOC digital radio broadcasting signals can be transmitted in a hybrid format including an analog modulated carrier in combination with a plurality of digitally modulated carriers or in an all-digital format wherein the analog modulated carrier is not used. Using the hybrid mode, broadcasters may continue to transmit analog AM and FM simultaneously with higher-quality and more robust digital signals, allowing themselves and their listeners to convert from analog-to-digital radio while maintaining their current frequency allocations.

One feature of digital transmission systems is the inherent ability to simultaneously transmit both digitized audio and data. Thus the technology also allows for wireless data services from AM and FM radio stations. The broadcast signals can include metadata, such as the artist, song title, or station call letters. Special messages about events, traffic, and weather can also be included. For example, traffic information, weather forecasts, news, and sports scores can all be scrolled across a radio receiver's display while the user listens to a radio station.

IBOC technology can provide digital quality audio, superior to existing analog broadcasting formats. Because each IBOC signal is transmitted within the spectral mask of an existing AM or FM channel allocation, it requires no new spectral allocations. IBOC digital radio broadcasting promotes economy of spectrum while enabling broadcasters to supply digital quality audio to the present base of listeners.

Multicasting, the ability to deliver several audio programs or streams over one channel in the AM or FM spectrum, enables stations to broadcast multiple streams on separate supplemental or sub-channels of the main frequency. For example, multiple streams of data can include alternative music formats, local traffic, weather, news, and sports. The supplemental channels can be accessed in the same manner as the traditional station frequency using tuning or seeking functions. For example, if the analog modulated signal is centered at 94.1 MHz, the same broadcast in IBOC digital radio broadcasting can include supplemental channels 94.1-1, 94.1-2, and 94.1-3. Highly specialized programming on supplemental channels can be delivered to tightly targeted audiences, creating more opportunities for advertisers to integrate their brand with program content. As used herein, multicasting includes the transmission of one or more programs in a single digital radio broadcasting channel or on a single digital radio broadcasting signal. Multicast content over IBOC digital radio broadcasting transmissions can include a main program service (MPS), supplemental program services (SPS), program service data (PSD), and/or other broadcast data.

The National Radio Systems Committee, a standard-setting organization sponsored by the National Association of Broadcasters and the Consumer Electronics Association, adopted an IBOC standard, designated NRSC-5A, in September 2005. NRSC-5A, the disclosure of which is incorporated herein by reference, sets forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the NRSC at http://www.nrscstandards.org/standards.asp. iBiquity's HD Radio technology is an implementation of the NRSC-5A IBOC standard. Further information regarding HD Radio technology can be found at www.hdradio.com and www.ibiquity.com.

Other types of digital radio broadcasting systems include satellite systems such as Satellite Digital Audio Radio Service (SDARS, e.g., XM Radio™, Sirius®), Digital Audio Radio Service (DARS, e.g., WorldSpace®), and terrestrial systems such as Digital Radio Mondiale (DRM), Eureka 147 (branded as DAB Digital Audio Broadcasting®), DAB Version 2, and FMeXtra®. As used herein, the phrase "digital radio broadcasting" encompasses digital audio and data broadcasting including in-band on-channel broadcasting, as well as other digital terrestrial broadcasting and satellite broadcasting.

In a system configured to broadcast hybrid format signals, i.e. signals including an analog modulated carrier in combination with a plurality of digitally modulated subcarriers, a transmitter typically translates a digital baseband frequency signal to a radio frequency (e.g., an FM carrier frequency in the range of 87.9 MHz to 107.9 MHz). A receiver then receives the radio frequency signal, translates the signal back to the baseband frequency, and demodulates the digital and analog portions of the baseband signal in separate pathways. However, there may be a frequency difference between the transmitter oscillator and the receiver oscillator that causes a frequency error, which can result in the baseband signal at the receiver being offset from DC. As a result, conventional radio receivers may include frequency offset and tracking modules that estimate and remove the initial frequency error and then track additional frequency errors as they occur in the digital signal pathway. However, the present inventors have observed that the initial frequency error may be larger than the receiver can estimate due to limitations of existing frequency offset estimation algorithms, thus increasing the requirement for frequency stability of the receiver oscillator. For example, conventional frequency offset algorithms are typically limited to an offset of +/−14 kHz while the input frequency offset can exceed these limits in some instances.

The inventors of the present disclosure have found that it may be desirable to estimate the initial frequency offset of the digital signal by determining and using the frequency offset of the analog signal. It should be noted that this novel approach is not typically available in pure digital radio receivers, which lack an analog signal from which to obtain a frequency offset.

SUMMARY

Embodiments described in the present disclosure are directed to systems and methods that may satisfy this need. According to exemplary embodiments, a method of correcting a frequency error in a digital portion of a radio broadcast signal is disclosed. The method comprises the steps of receiving a radio broadcast signal having an analog portion and a digital portion; separating the analog portion of the radio broadcast signal and the digital portion of the radio broadcast signal; determining a coarse frequency offset of the analog portion of the radio broadcast signal; generating an error signal for adjusting a frequency of the digital portion of the radio broadcast signal, wherein the error signal is based on the coarse frequency offset of the analog portion of the radio broadcast signal; and adjusting the frequency of the digital portion of the radio broadcast signal with the error signal that is based on the coarse frequency offset of the analog portion of the radio broadcast signal, such that a frequency error in the digital portion of the radio broadcast signal is reduced below a predetermined amount.

A system comprising a processing system and a memory coupled to the processing system are described wherein the processing system is configured to carry out the above-described method. Computer programming instructions adapted to cause a processing system to carry out the above-described method may be embodied within any suitable computer readable storage medium.

BRIEF DESCRIPTION OF THE DRAWINGS

These and other features, aspects, and advantages of the present disclosure will become better understood with regard to the following description, appended claims, and accompanying drawings wherein:

DETAILED DESCRIPTION OF EXEMPLARY EMBODIMENTS

Figure 8:
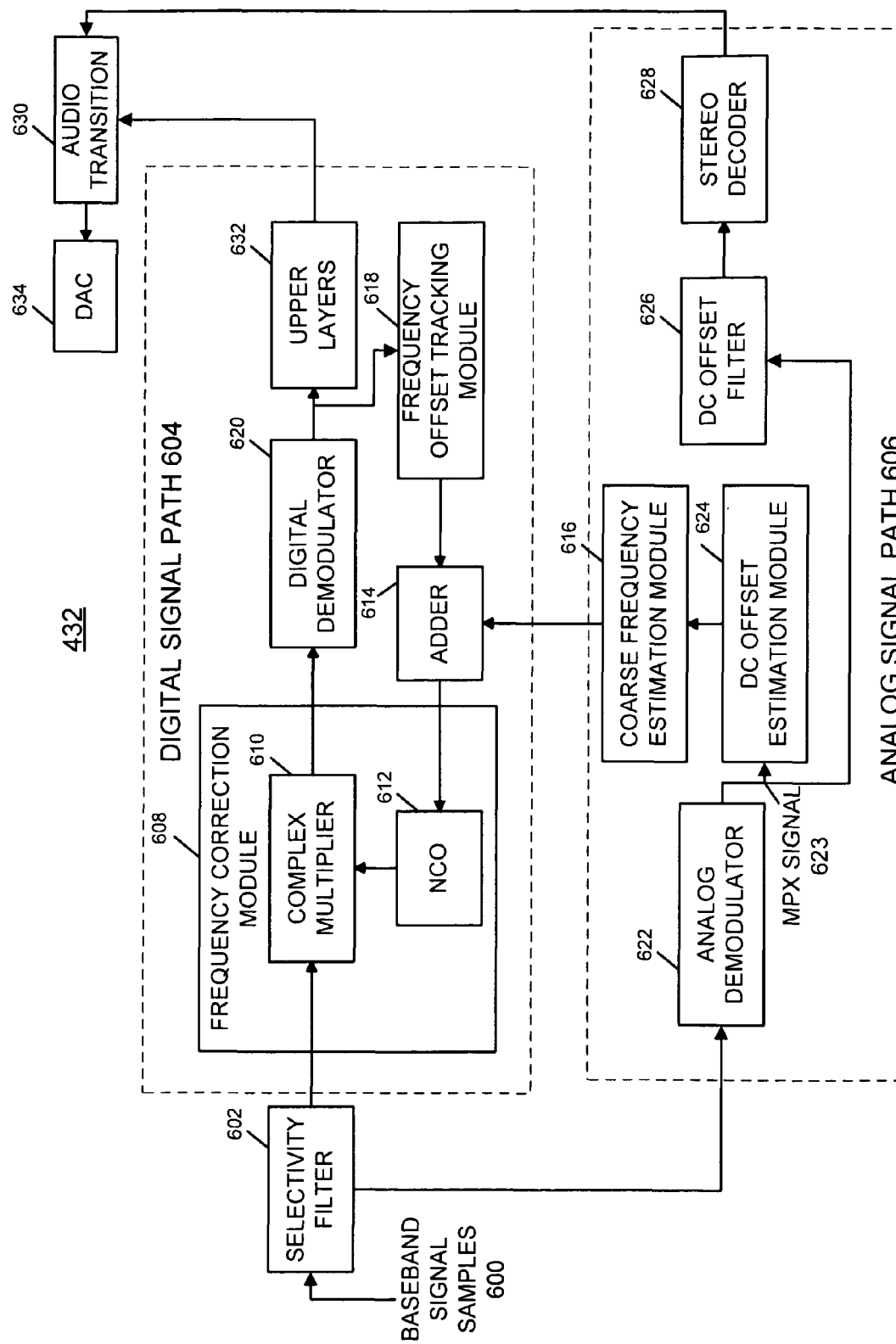
FIG. 8 illustrates a block diagram of an exemplary digital broadcast receiver in accordance with certain embodiments.
Figure 9:
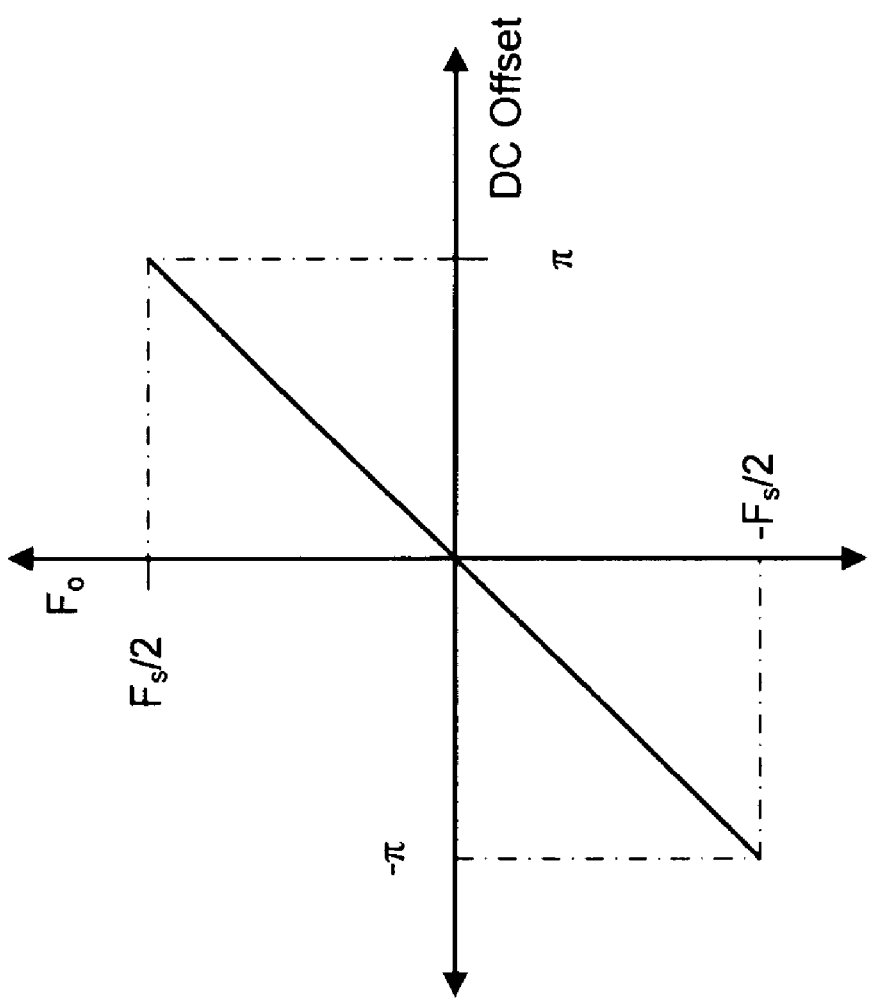
FIG. 9 illustrates an exemplary graph of DC offset vs. frequency offset in accordance with certain embodiments.
Figure 10:
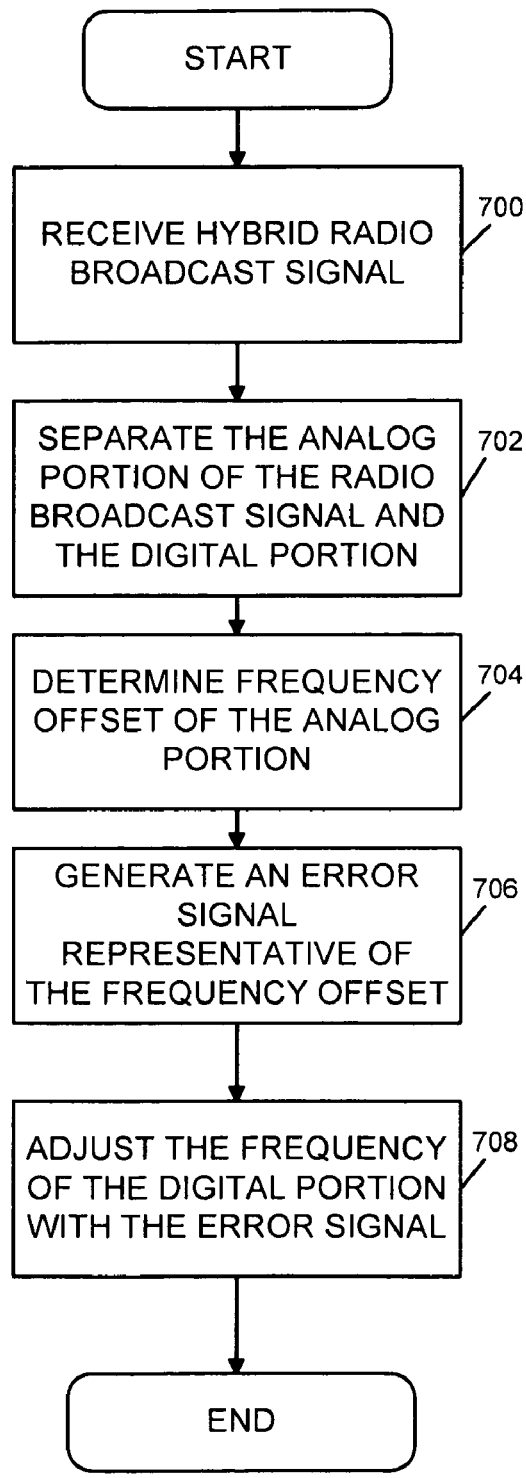
FIG. 10 illustrates an exemplary process of correcting a frequency offset in a digital radio broadcast receiver.

FIGS. 1-7 and the accompanying description herein provide a general description of an exemplary IBOC system, exemplary broadcasting equipment structure and operation, and exemplary receiver structure and operation. FIGS. 8-10 and the accompanying description herein provide a detailed description of exemplary approaches for frequency offset correction in a digital radio broadcast receiver. Whereas aspects of the disclosure are presented in the context of an exemplary IBOC system, it should be understood that the present disclosure is not limited to IBOC systems and that the teachings herein are applicable to other forms of digital and analog radio broadcasting as well.

Figure 1:
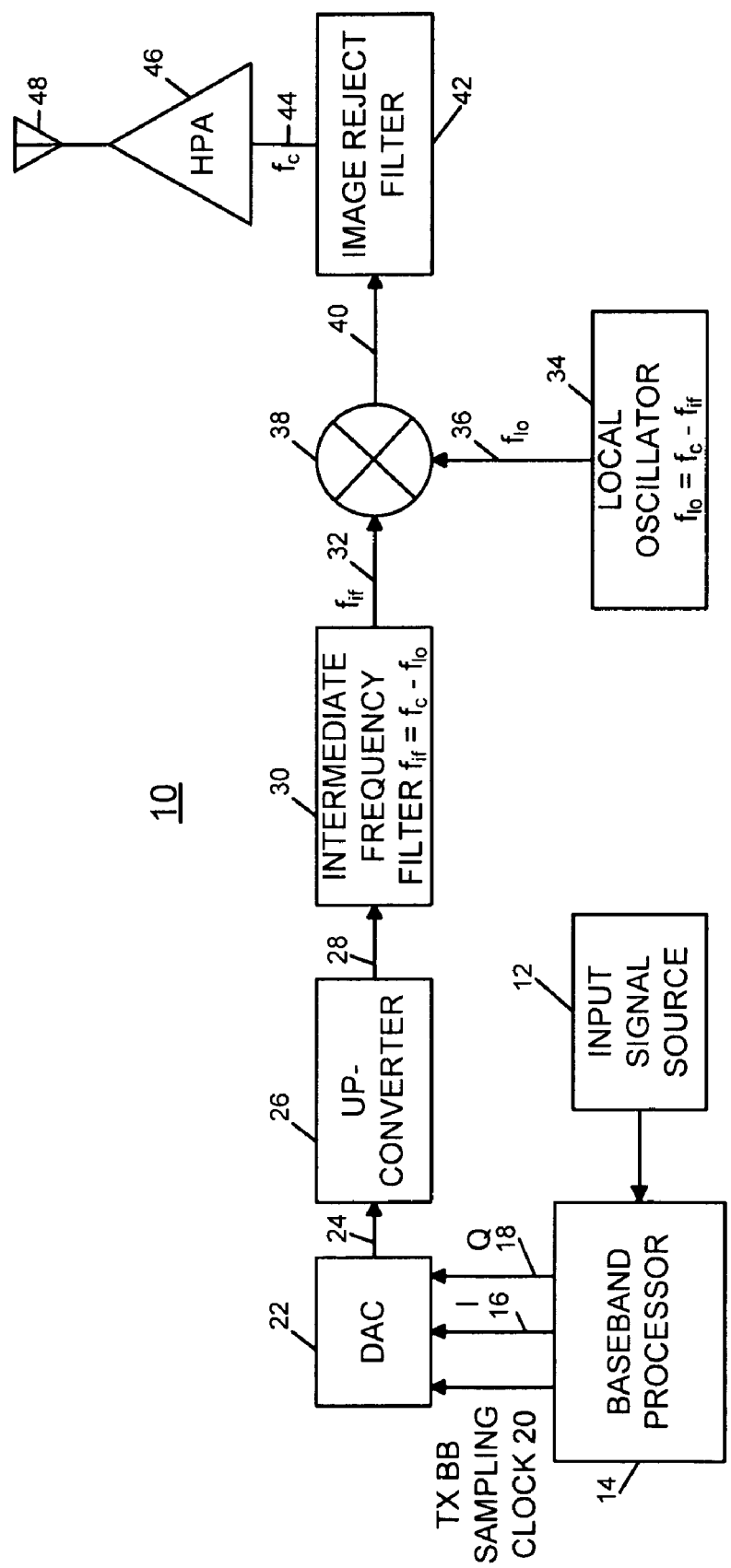
FIG. 1 illustrates a block diagram of an exemplary digital radio broadcast transmitter in accordance with certain embodiments.

Referring to the drawings, FIG. 1 is a block diagram of an exemplary digital radio broadcast transmitter 10 that broadcasts digital radio broadcasting signals. The exemplary digital radio broadcast transmitter may be a DAB transmitter such as an AM or FM IBOC transmitter, for example. An input signal source 12 provides the signal to be transmitted. The source signal may take many forms, for example, an analog program signal that may represent voice or music and/or a digital information signal that may represent message data such as traffic information. A baseband processor 14 processes the source signal in accordance with various known signal processing techniques, such as source coding, interleaving and forward error correction, to produce in-phase and quadrature components of a complex baseband signal on lines 16 and 18, and to produce a transmitter baseband sampling clock signal 20. Digital-to-analog converter (DAC) 22 converts the baseband signals to an analog signal using the transmitter baseband sampling clock 20, and outputs the analog signal on line 24. The analog signal is shifted up in frequency and filtered by the up-converter block 26. This produces an analog signal at an intermediate frequency $f_{if}$ on line 28. An intermediate frequency filter 30 rejects alias frequencies to produce the intermediate frequency signal $f_{if}$ on line 32. A local oscillator 34 produces a signal $f_{lo}$ on line 36, which is mixed with the intermediate frequency signal on line 32 by mixer 38 to produce sum and difference signals on line 40. The unwanted intermodulation components and noise are rejected by image reject filter 42 to produce the modulated carrier signal $f_c$ on line 44. A high power amplifier (HPA) 46 then sends this signal to an antenna 48.

In one example, a basic unit of transmission of the DAB signal is the modem frame, which is typically on the order of a second in duration. Exemplary AM and FM IBOC transmission systems arrange the digital audio and data in units of modem frames. In some embodiments, the systems are both simplified and enhanced by assigning a fixed number of audio frames to each modem frame. The audio frame period is the length of time required to render, e.g., play back audio for a user, the samples in an audio frame. For example, if an audio frame contains 1024 samples, and the sampling period is 22.67 μsec, then the audio frame period would be approximately 23.2 milliseconds. A scheduler determines the total number of bits allocated to the audio frames within each modem frame. The modem frame duration is advantageous because it may enable sufficiently long interleaving times to mitigate the effects of fading and short outages or noise bursts such as may be expected in a digital audio broadcasting system. Therefore the main digital audio signal can be processed in units of modem frames, and audio processing, error mitigation, and encoding strategies may be able to exploit this relatively large modem frame time without additional penalty.

In typical implementations, an audio encoder may be used to compress the audio samples into audio frames in a manner that is more efficient and robust for transmission and reception of the IBOC signal over the radio channel. The audio encoder encodes the audio frames using the bit allocation for each modem frame. The remaining bits in the modem frame are typically consumed by the multiplexed data and overhead. Any suitable audio encoder can initially produce the compressed audio frames such as an HDC encoder as developed by Coding Technologies of Dolby Laboratories, Inc., 999 Brannan Street, San Francisco, Calif. 94103-4938 USA; an Advanced Audio Coding (AAC) encoder; an MPEG-1 Audio Layer 3 (MP3) encoder; or a Windows Media Audio (WMA) encoder. Typical lossy audio encoding schemes, such as AAC, MP3, and WMA, utilize the modified discrete cosine transform (MDCT) for compressing audio data. MDCT based schemes typically compress audio samples in blocks of a fixed size. For example, in AAC encoding, the encoder may use a single MDCT block of length 1024 samples or 8 blocks of 128 samples. Accordingly, in implementations using an AAC coder, for example, each audio frame could be comprised of a single block of 1024 audio samples, and each modem frame could include 64 audio frames. In other typical implementations, each audio frame could be comprised of a single block of 2048 audio samples, and each modem frame could include 32 audio frames. Any other suitable combination of sample block sizes and audio frames per modem frame could be utilized.

In an exemplary IBOC system, the broadcast signal includes main program service (MPS) audio, MPS data (MPSD), supplemental program service (SPS) audio, and SPS data (SPSD). MPS audio serves as the main audio programming source. In hybrid modes, it preserves the existing analog radio programming formats in both the analog and digital transmissions. MPSD, also known as program service data (PSD), includes information such as music title, artist, album name, etc. Supplemental program service can include supplementary audio content as well as PSD. Station Information Service (SIS) is also provided, which comprises station information such as call sign, absolute time, position correlated to GPS, data describing the services available on the station. In certain embodiments, Advanced Applications Services (AAS) may be provided that include the ability to deliver many data services or streams and application specific content over one channel in the AM or FM spectrum, and enable stations to broadcast multiple streams on supplemental or sub-channels of the main frequency.

IBOC signals can be transmitted in both AM and FM radio bands, using a variety of waveforms. The waveforms include an FM hybrid IBOC DAB waveform, an FM all-digital IBOC DAB waveform (not shown), an AM hybrid IBOC DAB waveform, and an AM all-digital IBOC DAB waveform (not shown).

Figure 2A:
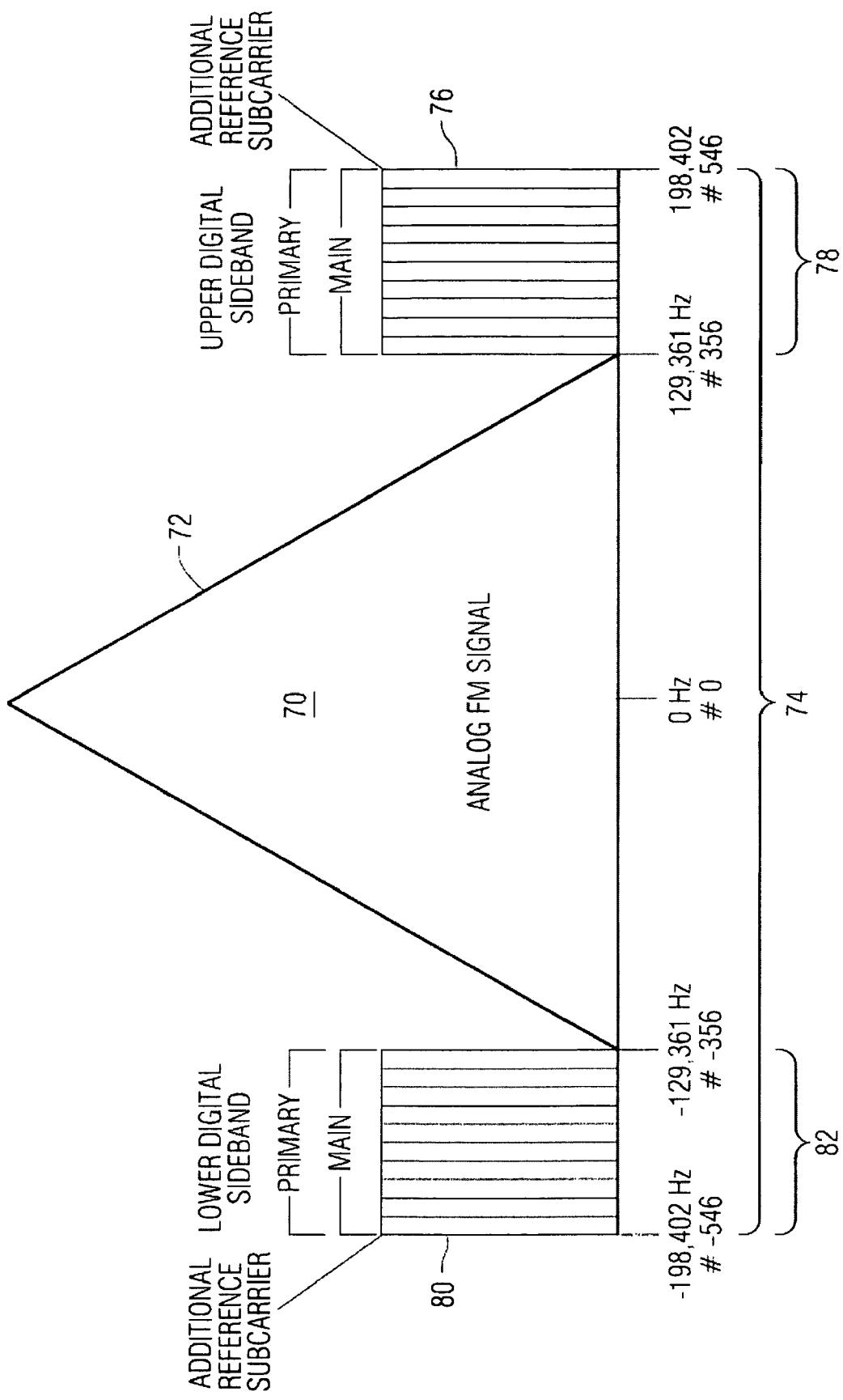
FIG. 2a is a schematic representation of an exemplary hybrid FM IBOC waveform.

FIG. 2a is a schematic representation of a hybrid FM IBOC waveform 70. The waveform includes an analog FM-modulated signal 72 located in the center of a broadcast channel 74, a first plurality of evenly spaced orthogonally frequency division multiplexed subcarriers 76 in an upper sideband 78, and a second plurality of evenly spaced orthogonally frequency division multiplexed subcarriers 80 in a lower sideband 82. The digitally modulated subcarriers are divided into partitions and various subcarriers are designated as reference subcarriers. A frequency partition is a group of 19 orthogonal frequency division multiplexed (OFDM) subcarriers containing 18 data subcarriers and one reference subcarrier.

The hybrid waveform includes an analog FM-modulated signal, plus digitally modulated subcarriers. The subcarriers are located at evenly spaced frequency locations. The subcarrier locations are numbered from −546 to +546. In the waveform of FIG. 2a, the subcarriers are at locations +356 to +546 and −356 to −546. Each primary main sideband is comprised of ten frequency partitions. Subcarriers 546 and −546, also included in the primary main sidebands, are additional reference subcarriers. The amplitude of each subcarrier can be scaled by an amplitude scale factor.

Figure 2B:
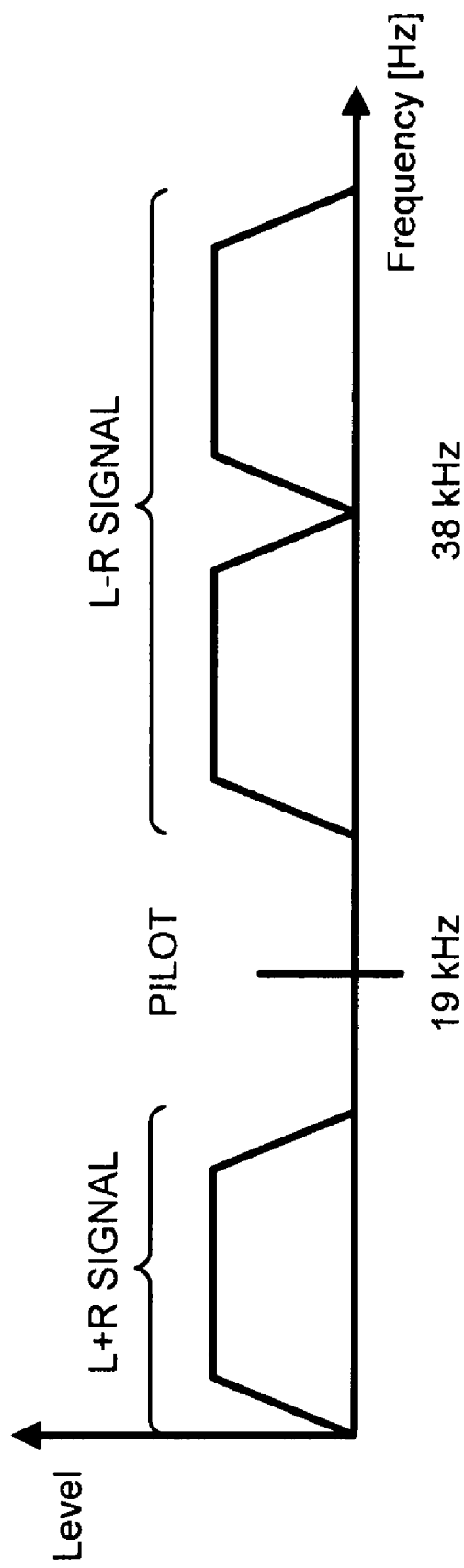
FIG. 2b is a schematic representation of an exemplary MPX signal.

MPX signals are often used in the transmission of analog FM-modulated stereo broadcast signals in the VHF range. In addition to the sound information, MPX signals may also contain additional information such as Automotive Radio Information and/or Radio Data System information. As illustrated in FIG. 2b, the frequency schemes of MPX signals typically include at baseband, a sum signal L+R, a pilot signal above the sum signal, and a suppressed-carrier amplitude-modulated difference signal L−R at twice the pilot frequency. In the case of FM radio, the pilot signal is typically at 19 kHz. For demodulation of the MPX signal components, which is typically done by mixing, carrier signals of the correct frequency and phase are provided to the demodulator with the pilot signal serving as a reference signal.

Figure 3:
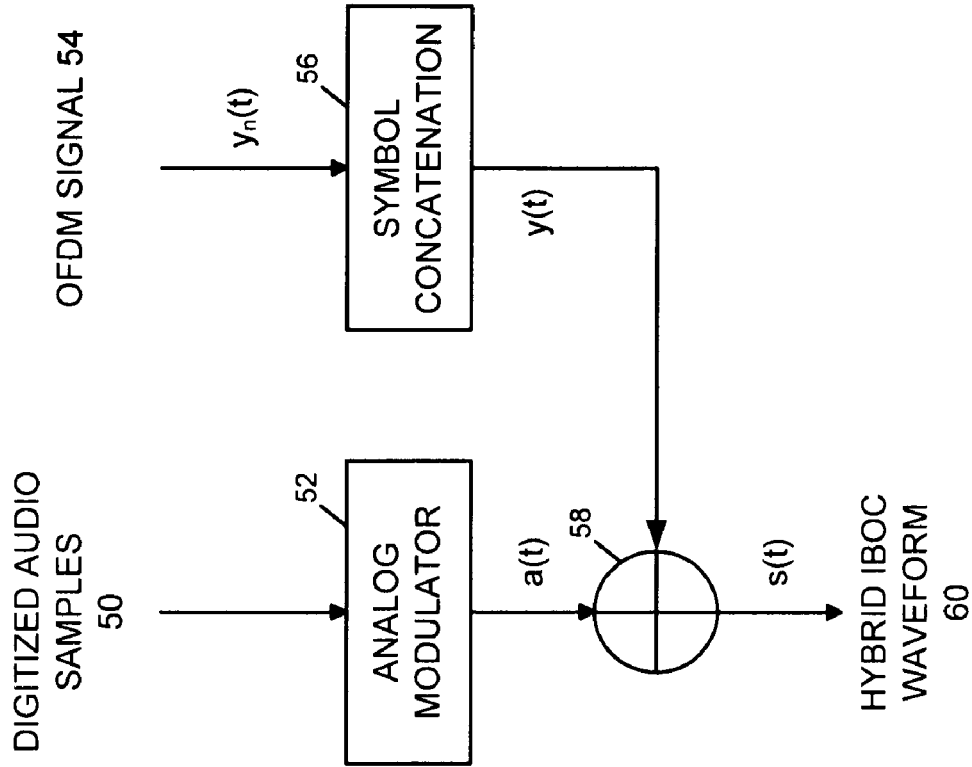
FIG. 3 is a schematic representation of an exemplary hybrid FM IBOC transmission subsystem in accordance with certain embodiments.

An exemplary functional block diagram of a hybrid FM IBOC transmission subsystem is illustrated in FIG. 3. The functions illustrated in FIG. 3 can be performed in the baseband processor 14 of FIG. 1, for example, which can comprise a processing system that may include one or more processing units configured (e.g., programmed with software and/or firmware) to perform the functionality described herein, wherein the processing system of the baseband processor can be suitably coupled to any suitable memory (e.g., RAM, Flash, ROM, etc.). Digitized audio samples 50 from input signal source 12 are input into an analog modulator 52, which performs initial processing of the samples, e.g., sample buffering and noise filtering, and digital modulation of the samples into a continuous time-domain waveform a(t) representing the analog portion of the FM IBOC signal. The digitized audio samples 50 may be, for example, a digitally sampled MPX signal. An OFDM signal 54 is generated by an OFDM signal generation module that receives complex, frequency-domain OFDM symbols from an OFDM subcarrier mapping function and outputs complex, baseband, time-domain pulses $y_n(t)$. The symbol concatenation module 56 concatenates the $y_n(t)$ symbols to form a continuous time domain waveform y(t) representing the digital portion of the FM IBOC signal. The mixer 58 combines the waveforms a(t) and y(t) and outputs a signal s(t) that represents the hybrid FM IBOC waveform 60. Any suitable technique may be used to create the FM IBOC waveform and NRSC 5-A, for example, describes such a method in more detail, the entire contents of which are incorporated herein by reference.

Figure 4:
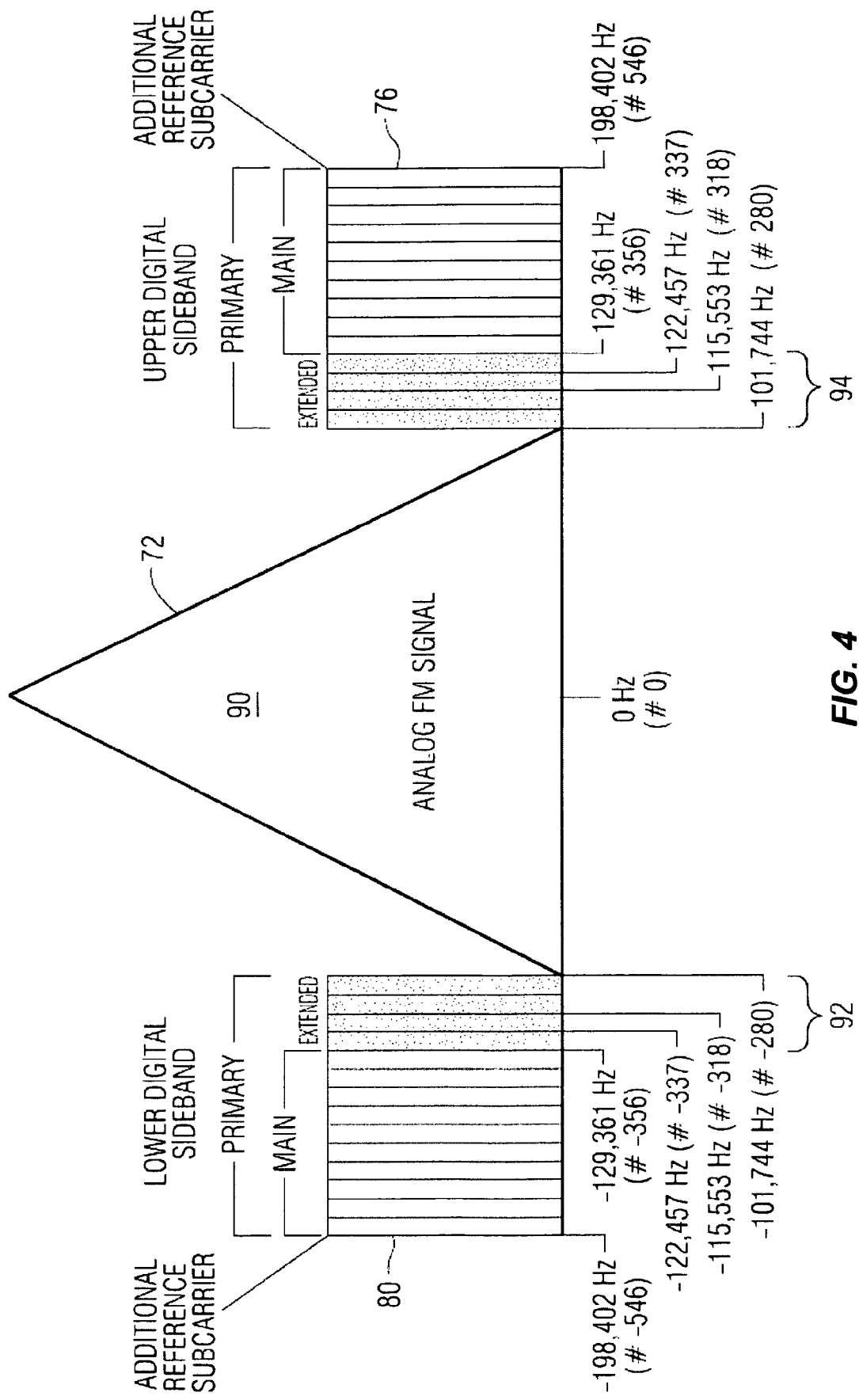
FIG. 4 is a schematic representation of an exemplary extended hybrid FM IBOC waveform.

FIG. 4 is a schematic representation of an extended hybrid FM IBOC waveform 90. The extended hybrid waveform is created by adding primary extended sidebands 92, 94 to the primary main sidebands present in the hybrid waveform. One, two, or four frequency partitions can be added to the inner edge of each primary main sideband. The extended hybrid waveform includes the analog FM signal plus OFDM primary main subcarriers (subcarriers +356 to +546 and −356 to −546) and some or all primary extended subcarriers (subcarriers +280 to +355 and −280 to −355).

The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

In each of the waveforms, the digital signal is multiplexed using orthogonal frequency division multiplexing (OFDM). OFDM is a parallel modulation scheme in which the data stream modulates a large number of orthogonal subcarriers, for example using quadrature phase shift keying (QPSK), which are transmitted simultaneously. OFDM is inherently flexible, readily allowing the mapping of logical channels to different groups of subcarriers.

In the hybrid waveform, the digital signal is transmitted in primary main (PM) sidebands on either side of the analog FM-modulated signal in the hybrid waveform. The power level of each sideband is appreciably below the total power in the analog FM signal. The analog FM-modulated signal may be the same as the analog FM-modulated signal 72 previously described.

In the extended hybrid waveform, the bandwidth of the hybrid sidebands can be extended toward the analog FM signal to increase digital capacity. This additional spectrum, allocated to the inner edge of each primary main sideband, is termed the primary extended (PX) sideband.

Figure 5A:
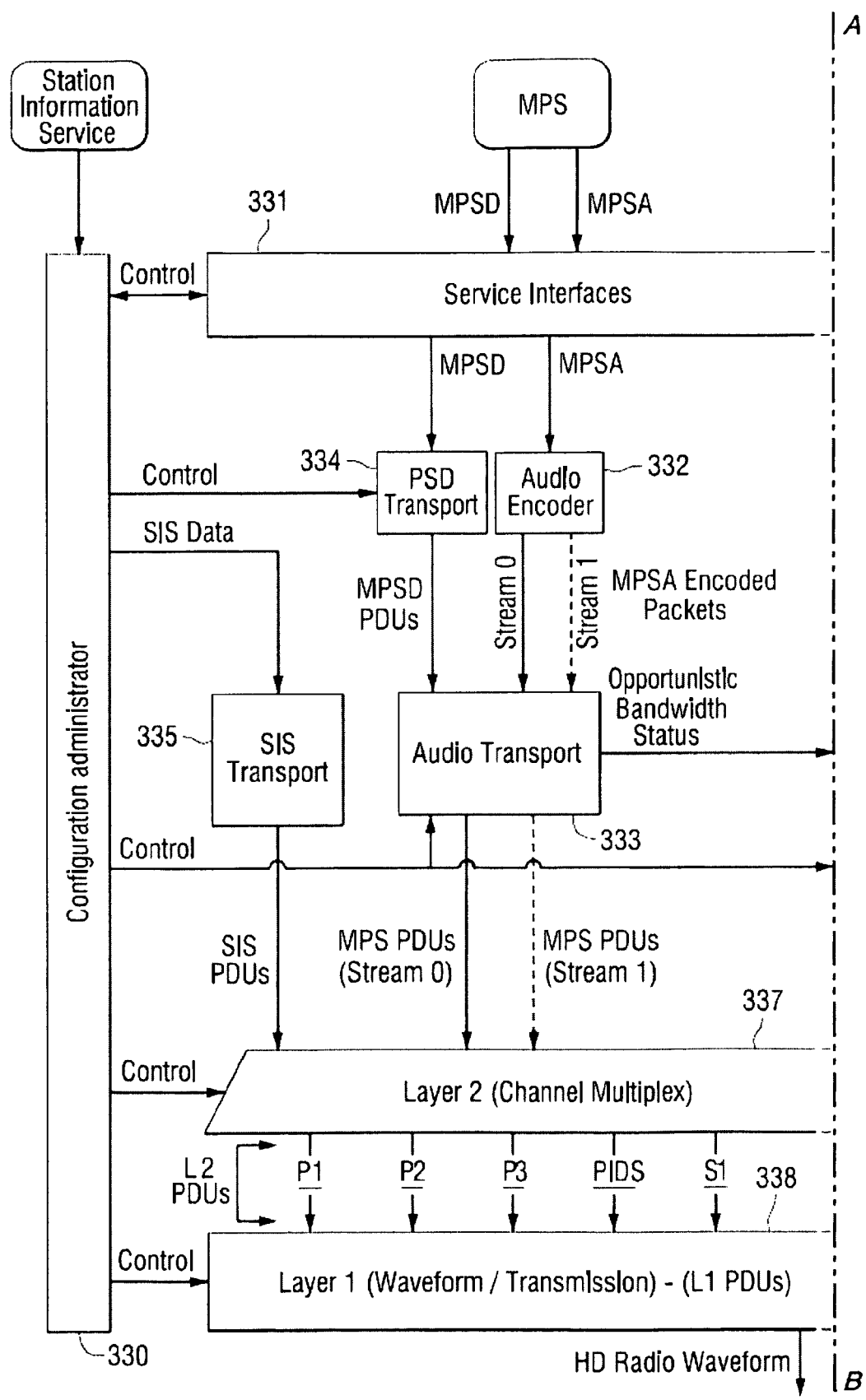
FIGS. 5a and 5b are diagrams of an IBOC logical protocol stack from the transmitter perspective.
Figure 5B:
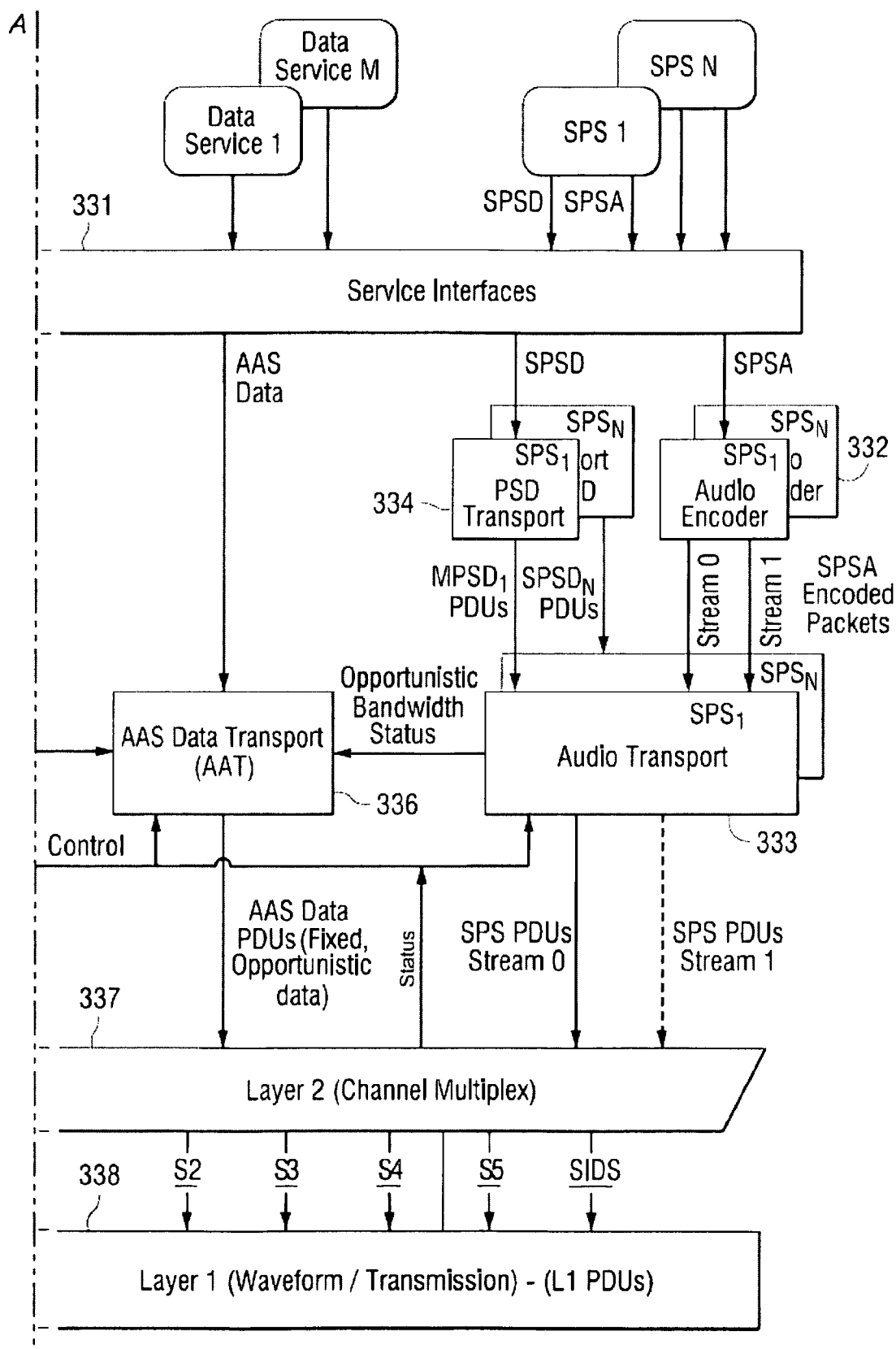

FIGS. 5a and 5b are diagrams of an IBOC logical protocol stack from the transmitter perspective. From the receiver perspective, the logical stack will be traversed in the opposite direction. Most of the data being passed between the various entities within the protocol stack are in the form of protocol data units (PDUs). A PDU is a structured data block that is produced by a specific layer (or process within a layer) of the protocol stack. The PDUs of a given layer may encapsulate PDUs from the next higher layer of the stack and/or include content data and protocol control information originating in the layer (or process) itself. The PDUs generated by each layer (or process) in the transmitter protocol stack are inputs to a corresponding layer (or process) in the receiver protocol stack.

As shown in FIGS. 5a and 5b, there is a configuration administrator 330, which is a system function that supplies configuration and control information to the various entities within the protocol stack. The configuration/control information can include user defined settings, as well as information generated from within the system such as GPS time and position. The service interfaces 331 represent the interfaces for all services. The service interface may be different for each of the various types of services. For example, for MPS audio and SPS audio, the service interface may be an audio card. For MPS data and SPS data the interfaces may be in the form of different APIs. For all other data services the interface is in the form of a single API. An audio codec 332 encodes both MPS audio and SPS audio to produce core (Stream 0) and optional enhancement (Stream 1) streams of MPS and SPS audio encoded packets, which are passed to audio transport 333. Audio codec 332 also relays unused capacity status to other parts of the system, thus allowing the inclusion of opportunistic data. MPS and SPS data is processed by PSD transport 334 to produce MPS and SPS data PDUs, which are passed to audio transport 333. Audio transport 333 receives encoded audio packets and PSD PDUs and outputs bit streams containing both compressed audio and program service data. The SIS transport 335 receives SIS data from the configuration administrator and generates SIS PDUs. A SIS PDU can contain station identification and location information, indications regarding provided audio and data services, as well as absolute time and position correlated to GPS. The AAS data transport 336 receives AAS data from the service interface, as well as opportunistic bandwidth data from the audio transport, and generates AAS data PDUs, which can be based on quality of service parameters. The transport and encoding functions are collectively referred to as Layer 4 of the protocol stack and the corresponding transport PDUs are referred to as Layer 4 PDUs or L4 PDUs. Layer 2, which is the channel multiplex layer, (337) receives transport PDUs from the SIS transport, AAS data transport, and audio transport, and formats them into Layer 2 PDUs. A Layer 2 PDU includes protocol control information and a payload, which can be audio, data, or a combination of audio and data. Layer 2 PDUs are routed through the correct logical channels to Layer 1 (338), wherein a logical channel is a signal path that conducts L1 PDUs through Layer 1 with a specified grade of service. There are multiple Layer 1 logical channels based on service mode, wherein a service mode is a specific configuration of operating parameters specifying throughput, performance level, and selected logical channels. The number of active Layer 1 logical channels and the characteristics defining them vary for each service mode. Status information is also passed between Layer 2 and Layer 1. Layer 1 converts the PDUs from Layer 2 and system control information into an AM or FM IBOC DAB waveform for transmission. Layer 1 processing can include scrambling, channel encoding, interleaving, OFDM subcarrier mapping, and OFDM signal generation. The output of OFDM signal generation is a complex, baseband, time domain pulse representing the digital portion of an IBOC signal for a particular symbol. Discrete symbols are concatenated to form a continuous time domain waveform, which is modulated to create an IBOC waveform for transmission.

Figure 6:
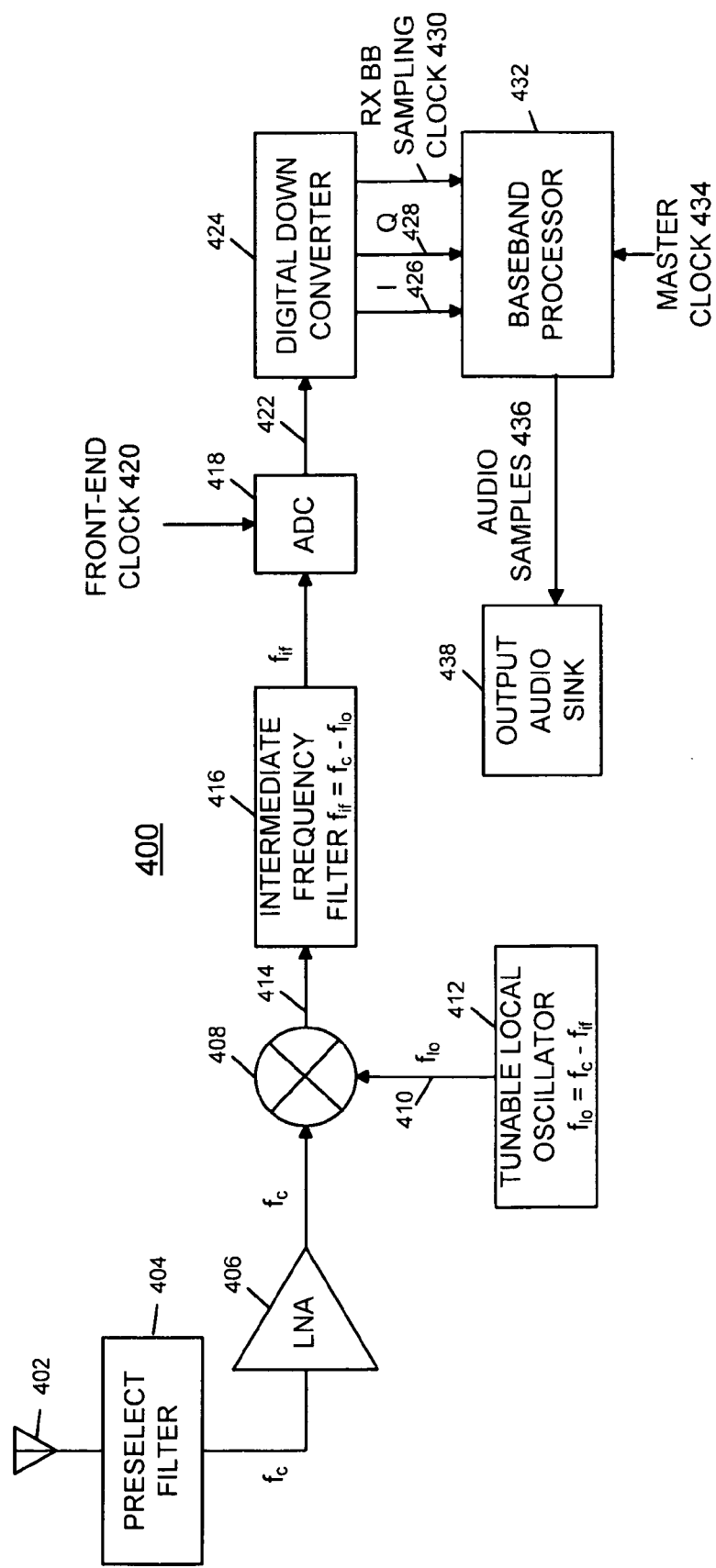
FIG. 6 illustrates a block diagram of an exemplary digital radio broadcast receiver in accordance with certain embodiments.

A digital radio broadcast receiver performs the inverse of some of the functions described for the transmitter. FIG. 6 is a block diagram of an exemplary digital radio broadcast receiver 400. The exemplary digital radio broadcast receiver 400 may be a DAB receiver such as an AM or FM IBOC receiver, for example. The digital broadcast signal is received on antenna 402. A bandpass preselect filter 404 passes the frequency band of interest, including the desired signal at frequency $f_c$, but rejects the image signal at $f_c$-$2f_{if}$ (for a low side lobe injection local oscillator). Low noise amplifier (LNA) 406 amplifies the signal. The amplified signal is mixed in mixer 408 with a local oscillator signal $f_{lo}$ supplied on line 410 by a tunable local oscillator 412. This creates sum ($f_c$+$f_{lo}$) and difference ($f_c$-$f_{lo}$) signals on line 414. Intermediate frequency filter 416 passes the intermediate frequency signal $f_{if}$ and attenuates frequencies outside of the bandwidth of the modulated signal of interest. An analog-to-digital converter (ADC) 418 operates using the front-end clock 420 to produce digital samples on line 422. Digital down converter 424 frequency shifts, filters and decimates the signal to produce lower sample rate in-phase and quadrature signals on lines 426 and 428. The digital down converter 424 also outputs a receiver baseband sampling clock signal 430. A baseband processor 432, operating using the master clock 434 that may or may not be generated from the same oscillator as the front-end clock 420, then provides additional signal processing. The baseband processor 432 produces output audio samples on line 436 for output to audio sink 438. The output audio sink may be any suitable device for rendering audio such as an audio-video receiver or car stereo system.

Figure 7:
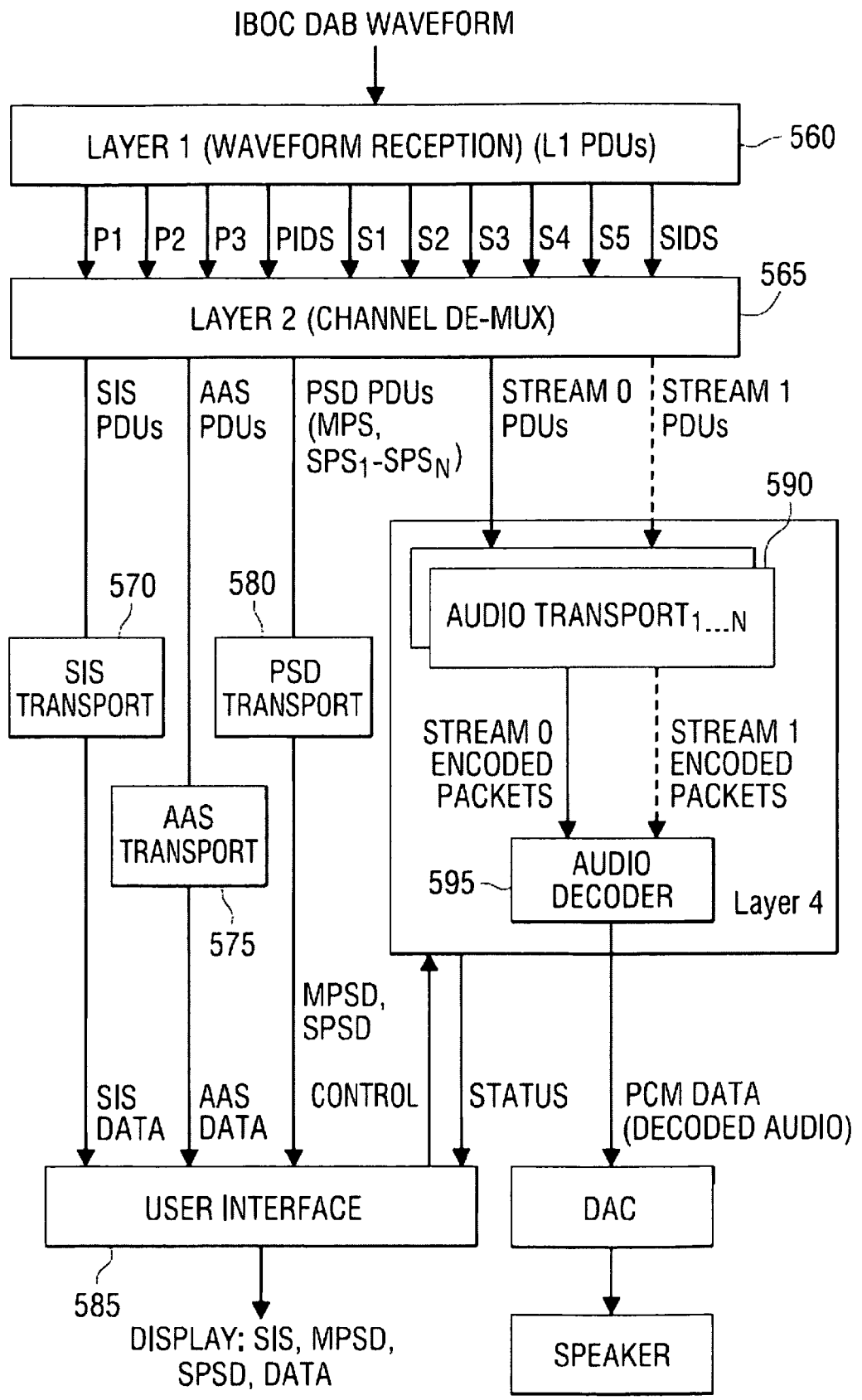
FIG. 7 is a diagram of an IBOC logical protocol stack from the receiver perspective.

FIG. 7 shows the logical protocol stack from the receiver perspective. An IBOC waveform is received by the physical layer, Layer 1 (560), which demodulates the signal and processes it to separate the signal into logical channels. The number and kind of logical channels will depend on the service mode, and may include logical channels P1-P3, Primary IBOC Data Service Logical Channel (PIDS), S1-S5, and SIDS. Layer 1 produces L1 PDUs corresponding to the logical channels and sends the PDUs to Layer 2 (565), which demultiplexes the L1 PDUs to produce SIS PDUs, AAS PDUs, PSD PDUs for the main program service and any supplemental program services, and Stream 0 (core) audio PDUs and Stream 1 (optional enhanced) audio PDUs. The SIS PDUs are then processed by the SIS transport 570 to produce SIS data, the AAS PDUs are processed by the AAS transport 575 to produce AAS data, and the PSD PDUs are processed by the PSD transport 580 to produce MPS data (MPSD) and any SPS data (SPSD). The SIS data, AAS data, MPSD and SPSD are then sent to a user interface 590. The SIS data, if requested by a user, can then be displayed. Likewise, MPSD, SPSD, and any text based or graphical AAS data can be displayed. The Stream 0 and Stream 1 PDUs are processed by Layer 4, comprised of audio transport 590 and audio decoder 595. There may be up to N audio transports corresponding to the number of programs received on the IBOC waveform. Each audio transport produces encoded MPS packets or SPS packets, corresponding to each of the received programs. Layer 4 receives control information from the user interface, including commands such as to store or play programs, and to seek or scan for radio stations broadcasting an all-digital or hybrid IBOC signal. Layer 4 also provides status information to the user interface.

As previously discussed, IBOC digital radio broadcasting signals can be transmitted in a hybrid format that includes an analog modulated carrier (e.g., frequency modulated (FM) or amplitude modulated (AM)) in combination with a plurality of digitally modulated carriers (e.g., orthogonal frequency division multiplexing (OFDM) subcarriers). Thus the digital radio broadcast receiver operating in hybrid mode decodes both an analog portion (e.g., FM or AM) and a digital portion (e.g., OFDM) of the digital radio broadcast audio signal.

As discussed above, the digital portion of a hybrid radio broadcast signal (e.g., an OFDM signal) is sampled to produce in-phase (I) and quadrature (Q) samples that represent the real and imaginary valued components respectively of a complex-valued OFDM signal. Ideally, the sampled OFDM signal is multiplied with an error signal generated by, for example, a numerically controlled oscillator (NCO) to directly generate the digital baseband signal for demodulation. However, the output of the multiplication may not be exactly at baseband, i.e., it may have a frequency offset. This offset may be caused by a difference between the frequency of the local oscillator 412 and the frequency of the transmitter oscillator 34. Thus, there may be a local oscillator frequency offset (i.e., a carrier frequency offset) with respect to the transmitter oscillator frequency.

An exemplary functional block diagram of a process for frequency offset correction is illustrated in FIG. 8. The functions illustrated in FIG. 8 can be performed in the baseband processor 432 of FIG. 6, for example, which can comprise a processing system that may include one or more processing units configured (e.g., programmed with software and/or firmware) to perform the functionality described herein, wherein the processing system of the baseband processor can be suitably coupled to any suitable memory (e.g., RAM, Flash, ROM, etc.). For example, a semiconductor chip may be fabricated by known methods in the art to include a processing system that comprises one or more processors as well as a memory, e.g., the processing system and the memory may be arranged in a single semiconductor chip, if desired, according to known methods.

The signal samples 600 generated by the digital downconverter 424 that include both the analog portion and digital portion of the baseband signal enter a selectivity filter 602, where the baseband signal is split into the digital signal path 604 and the analog signal path 606 via filters. Such filters are known to those of skill in the art. In the digital path 604, the digital samples enter a frequency correction module 608 that up-shifts or down-shifts (i.e. adjusts) the digital samples so that the baseband signal is centered around DC. In other words, the frequency correction module 608 reduces a frequency error in the digital samples below a predetermined amount that is sufficient to allow robust demodulation of the samples. This frequency error may be expressed in terms Hz or kHz. The frequency error before correction depends on the frequency instability in the receiver local oscillator. For example, a local oscillator with a frequency instability of 100 parts per million could have a frequency offset on the order of, for example, 10 kHz assuming a 100 MHz signal. Obviously, the frequency offset can vary widely depending on the frequency instability of the local oscillator and typically more expensive oscillators can have lower frequency instabilities.

The frequency correction module 608 contains a complex multiplier 610 that multiplies the digital samples with a signal generated by the NCO 612. The complex multiplier 610 and NCO 612 can be implemented in hardware, software, or any suitable combination thereof as will be appreciated by those of ordinary skill in the art. The NCO 612 receives a frequency error signal generated by an adder 614. The adder 614 sums input signals to produce an output and can be implemented in any suitable combination of hardware and/or software.

In conventional IBOC receiver implementations, the frequency correction value provided to the NCO 612 is a sum of the fine frequency offset value from a frequency offset tracking module 618 and the coarse frequency offset from the digital demodulator 620. In these conventional implementations, the coarse frequency offset $F_o$ could be calculated using identification information carried in the reference subcarrier ID (RSID). The RSID is described in HD Radio™ Air Interface Design Description Layer 1 FM, Rev. F, Aug. 7, 2007 available at http://www.nrscstandards.org/standards.asp and incorporated herein by reference in its entirety. These reference subcarriers are grouped into partitions. Since the RSID is a 2-bit value designating a partition, only 4 partitions could be uniquely identified using this approach. This would limit the range of frequency estimation to approximately +/−2 partitions. For example, if each frequency partition is approximately 7 kHz, then the maximum range for the estimation of coarse frequency offset value would be +/−14 kHz.

In contrast to conventional implementations, embodiments of the present disclosure determine the coarse frequency offset based on the frequency offset of the analog portion of the signal. The input signals to the adder 614 include a coarse frequency offset and a fine frequency offset. The coarse frequency offset estimation module 616 generates the coarse frequency offset based on the DC offset of the analog FM-modulated signal and the frequency offset tracking module 618 generates the fine frequency offset based on feedback from the digital demodulator 620. In certain embodiments the error signal may not include a fine frequency offset, for example, during frequency acquisition. The predetermined amount below which the frequency error can be reduced by certain embodiments of the present disclosure is typically a fraction of one subcarrier spacing. Subcarrier spacing may be, for example, on the order of +/−186 Hz. The predetermined amount will vary depending on the particular implementation requirements as will be appreciated by those of skill in the art.

The coarse frequency offset is determined at the coarse frequency offset module 616 by analyzing the analog FM-modulated signal in the analog signal path 606. It should be noted that this novel approach is not available in pure digital radio receivers, which lack an analog signal from which to obtain a frequency offset. The baseband signal samples from the analog portion of the signal are transmitted from the selectivity filter 602 to an analog demodulator 622. It should be noted that these signal samples will typically include substantially the same frequency offset as the digital signal samples for the same reasons discussed above. The analog demodulator 622 performs initial processing of the samples, e.g., sample buffering and noise filtering, and demodulation of the samples into a demodulated audio signal. While the exemplary embodiments herein are described in terms of MPX signal samples 623 as the demodulated audio signal, embodiments of the present disclosure are not limited thereto. For example, the demodulated audio signal could be samples of an FM mono signal. In exemplary embodiments, the demodulated audio signal is processed by the stereo decoder 628 to generate a stereo audio signal.

The FM demodulation process translates an instantaneous frequency of the baseband signal at the input of the analog demodulator 622 to a voltage at the output of the analog demodulator 622 in the form of the demodulated audio signal. In the absence of a frequency offset the average voltage at the output should be 0V. Therefore, any constant frequency offset at the input of the analog demodulator 622 will manifest itself as the constant voltage offset from 0V at the output of the analog demodulator 622. Equivalently, it can be said that the demodulated audio signal will have a DC offset. The amount of this DC offset will be proportional to the frequency offset at the input of the analog demodulator 622. Any suitable method for determining the DC offset can be used. For example, DC offset estimation can be accomplished by estimating the mean value of an MPX signal by, for example, passing the MPX signal through an averaging filter. Alternatively, the MPX signal could be passed through a narrowband low-pass filter to obtain the DC offset.

In an exemplary embodiment, the coarse frequency offset is determined by first estimating the mean value of MPX signal samples 623. This mean value represents the DC offset, which is proportional to the frequency offset. For example, assume that Z represents the demodulation output of the analog demodulator 622 and (I, Q) represents the baseband signal samples at the input of the analog demodulator 622 with a sampling frequency of $F_s$. Therefore Z=Demod[(I,Q)]. Therefore, $$DC\_offset = mean(Z)$$

$$where\ mean(Z) = \sum_{i=1}^{N} \frac{Z_i}{N}$$

and N=number of Z samples used for the sum, which can be determined empirically based on the number of samples needed to achieve robust estimation of the DC offset.

The relationship between the frequency offset and the DC offset follows from the operation of the analog demodulator 622. For example, the instantaneous phase of the complex baseband signal at the input of the analog demodulator 622 can be represented as:

$$\varphi(t) = \omega_o t + \theta(t)$$

where, $\omega_o = 2\pi F_o$, $F_o$=frequency offset;

$\varphi(t)$=instantaneous phase;

$\theta(t)$=phase that can be determined by the modulating signal used in frequency modulation;

$t = n*T_s$, n=0, 1, 2, ... is a discrete time;

$T_s = 1/F_s$, where $T_s$ is a sampling interval and $F_s$ is a sampling rate

The analog demodulator 622 performs phase differentiation so that the output of the analog demodulator 622 is $$D(t) = \frac{\partial(\varphi(t))}{\partial(t)} = 2\pi \frac{F_o}{F_s} + A(T);$$

where A(t) is the demodulated analog audio signal and $$2\pi \frac{F_o}{F_s}$$

is a DC offset. Thus, an exemplary relation between frequency offset and DC offset can be expressed using the following formula:

$$F_o = \frac{F_s}{2\pi} * DC\_offset$$

This relationship is illustrated in FIG. 9, which shows an exemplary relationship between the coarse frequency offset on the Y-axis and the DC offset on the X-axis.

The sampling frequency $F_s$ determines the theoretical positive and negative coarse frequency offset bounds. However, in practice the factor that limits the maximum coarse frequency offset estimation is typically the bandwidth of filters in the receiver prior to the analog demodulator 622. This bandwidth is typically greater than 100 kHz which typically exceeds the frequency instability of the cheapest oscillators. Thus, this method provides extended range for coarse frequency estimation and, particularly, it is much higher than +/−14 kHz range in typical IBOC receivers.

In an exemplary operation, the DC offset estimation module 624 receives demodulated audio samples (e.g., MPX signal samples 623) from the analog demodulator 622 and determines the DC offset as described above. The DC offset is then output to the coarse frequency estimation module 616. The coarse frequency estimation module 616 calculates a frequency offset corresponding to the DC offset and outputs this value to the adder 614. The DC offset filter 626 removes the DC offset from the MPX signal samples 623 received from the analog demodulator 622 and transmits the signal to the stereo decoder 628, where the MPX signal is decoded into a stereo audio signal. The stereo audio signal is then output to the audio transition module 630.

The coarse frequency estimation module 616 may determine the coarse frequency offset at varying intervals. For example, in certain embodiments the coarse frequency offset module 616 may determine the coarse frequency upon initial tuning of the receiver to a new frequency. This initial coarse frequency offset may then be stored in memory, for example, in the coarse frequency estimation module 616 or in the frequency correction module 608, and used until the receiver is tuned to a new frequency. In certain embodiments, the coarse frequency estimation module 616 may determine the coarse frequency offset upon initial receiver tuning and then continuously update the coarse frequency offset. In certain embodiments, the coarse frequency estimation module 616 may determine the coarse frequency offset upon initial tuning and then update it periodically at some interval.

The coarse frequency offset $F_o$ will typically fluctuate due to changes in the audio modulating signal and the presence of noise or parasitic AM modulation. As a result, in certain embodiments the frequency offset is filtered to bring this fluctuation within one subcarrier spacing range (e.g., approximately +/−186 Hz). For example, the coarse frequency estimation module 616 can include IIR filters to perform the filtering. In this case, the filtered coarse frequency offset ($F_{filtered}$)=$\alpha F + F_{prev} \times (1-\alpha)$, where a is the IIR filter coefficient (e.g., 0.005), and where $F_{prev}=F_{filtered}$. In other words, each value of $F_{filtered}$ is calculated from the previously determined value of $F_{filtered}$, i.e., $F_{prev}$. This filtered coarse frequency offset is then outputted to the adder 614. As mentioned above, the coarse frequency offset estimation range is between $-F_s/2$ and $F_s/2$ Hz. In typical implementations, this range will be limited by the bandwidth of the narrowest filter in the receiver that precedes the analog demodulator 622. This range will typically exceed 100 kHz which is much larger than the offset caused by frequency instability in a typical receiver's local oscillator 412.

The frequency offset tracking module 618 determines the fine frequency offset based on, for example, estimation using reference subcarriers of an OFDM signal. This frequency offset has a finer granularity than the coarse frequency offset, i.e., in certain embodiments it is calculated within a subcarrier spacing. Fine frequency estimation and tracking is typically done by using the fact that frequency offset causes the phase rotation of the subcarriers over time. The rate of phase rotation of the subcarriers will be proportional to the frequency offset. Thus by comparing the angles between the same reference subcarriers in the adjacent OFDM symbols, the fine frequency offset can be estimated and tracked using a closed control loop which minimizes this rotation by adjusting the frequency. This method is known in the art, for example, see U.S. Pat. No. 6,807,241, which is incorporated herein by reference in its entirety.

The complex multiplier 610 outputs the adjusted samples to the digital demodulator 620, which performs all the necessary operations of OFDM demodulation, deinterleaving, code combining, FEC decoding, and error flagging. Data from the digital demodulator 620 is then passed to the upper layers module 624, which de-multiplexes the audio and data signals, performs audio transport decoding (e.g., Layer 2 and the audio transport portion of Layer 4 as described above in connection with FIG. 7), and decompresses the digital audio samples. The decompressed audio samples are then output to the audio transition module 630.

The audio transition module 630 digitally combines the stereo audio signal with the decompressed audio samples, when available. A transition control signal is input to the audio transition module to control the audio frame combination. This transition control signal controls the relative amounts of the analog and digital portions of the signal that are used to form the output. Typically the transition control signal is responsive to some measurement of degradation of the digital portion of the signal. Any suitable technique may be used to generate a transition control signal for blending and U.S. Pat. No. 6,178,317, for example, describes such a method for producing a blend control signal, the entire contents of which are incorporated herein by reference. The audio transition module 630 then outputs the digitally combined signal to the DAC 634, where it is converted into analog audio for rendering.

FIG. 10 illustrates an exemplary process for correcting a frequency error in a digital portion of a radio broadcast signal. In step 700, a digital radio receiver 400 receives a hybrid radio broadcast signal (i.e. a radio broadcast signal having an analog portion and a digital portion). The hybrid radio broadcast signal may be, for example, an in-band on-channel digital radio broadcast signal. The analog portion of the radio broadcast signal may be, for example, a frequency modulated (FM) signal. The digital portion of the radio broadcast signal may be, for example, an orthogonal frequency division multiplexed (OFDM) signal.

In step 702, a selectivity filter 602 separates the analog portion of the radio broadcast signal and the digital portion of the radio broadcast signal. It should be noted that both the analog and the digital portion of the signal may have a frequency error caused, for example, by frequency differences between the frequencies of transmitter and receiver local oscillators. The analog portion of the signal is sent to an analog demodulator 622, which demodulates the signal, and then to a DC offset estimation module 624.

In step 704, the DC offset estimation module 624 generates an estimated DC offset of the demodulated audio signal (e.g., an MPX signal or FM mono signal). The estimated DC offset may be determined by, for example, estimating a mean value of MPX samples produced by the analog demodulator 622. The mean value of the MPX samples may be produced by, for example, passing the MPX samples through an averaging filter. The mean value (i.e., estimated DC offset) of the MPX samples is representative of the frequency offset of the analog portion of the radio broadcast signal. Accordingly, a coarse frequency estimation module 616 can calculate the frequency offset of the analog portion of the radio broadcast signal based on the estimated DC offset.

In step 706, an adder 614 generates an error signal for adjusting a frequency of the digital portion of the radio broadcast signal, wherein the error signal includes the frequency offset of the analog portion of the radio broadcast signal. In certain embodiments the error signal also includes a fine frequency offset generated by a frequency offset tracking module 618.

Finally, in step 708, a frequency correction module 608 adjusts the frequency of the digital portion of the radio broadcast signal with the error signal such that the frequency error in the digital portion of the radio broadcast signal is below a predetermined amount that is sufficient to allow robust demodulation. The predetermined amount below which the frequency error can be reduced by certain embodiments of the present disclosure may be a fraction of one subcarrier spacing. In certain embodiments, the frequency correction module 608 may include a NCO 612 that generates a frequency correction signal from the error signal, and a complex multiplier 610 that multiplies the frequency correction signal with digital signal samples.

The previously described embodiments of the present disclosure may have notable advantages. For example, it should be noted that this novel approach is not typically available in pure digital radio receivers, which lack an analog signal from which to obtain a frequency offset. One advantage is that in certain embodiments, the range of frequency offsets that a digital radio receiver can tolerate is extended without imposing constraints on the frequency stability of receiver oscillators. This may allow the use of relatively inexpensive oscillators in the receivers.

Another advantage is that in certain embodiments, estimating the coarse frequency offset from the analog signal requires less processing power than estimating a coarse frequency offset from the digital signal. This can advantageously reduce complexity and cost of digital radio receiver components.

The exemplary approaches described may be carried out using any suitable combinations of software, firmware and hardware and are not limited to any particular combinations of such. Computer program instructions for implementing the exemplary approaches described herein may be embodied on a tangible computer readable storage medium, such as a magnetic disk or other magnetic memory, an optical disk (e.g., DVD) or other optical memory, RAM, ROM, or any other suitable memory such as Flash memory, memory cards, etc.

Additionally, the disclosure has been described with reference to particular embodiments. However, it will be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and all variations and equivalents which fall within the range of the claims are intended to be embraced therein.

What is claimed is:

1. A method for correcting a frequency error in a digital portion of a radio broadcast signal comprising the steps of:
 receiving a radio broadcast signal having an analog portion and a digital portion;
 separating the analog portion of the radio broadcast signal and the digital portion of the radio broadcast signal;
 determining a coarse frequency offset of the analog portion of the radio broadcast signal;
 generating an error signal for adjusting a frequency of the digital portion of the radio broadcast signal, wherein the error signal is based on the coarse frequency offset of the analog portion of the radio broadcast signal; and
 adjusting the frequency of the digital portion of the radio broadcast signal with the error signal that is based on the coarse frequency offset of the analog portion of the radio broadcast signal, such that a frequency error in the digital portion of the radio broadcast signal is reduced below a predetermined amount.

2. The method of claim 1 wherein the radio broadcast signal is an in-band-on-channel digital radio signal.

3. The method of claim 1 wherein the analog portion of the radio broadcast signal is a frequency modulated signal.

4. The method of claim 1 wherein the digital portion of the radio broadcast signal is an orthogonal frequency division multiplexed signal.

5. The method of claim 1 wherein determining the coarse frequency offset of the analog portion of the radio broadcast signal further comprises the steps of:
 demodulating a plurality of samples representative of the analog portion of the radio broadcast signal to generate a plurality of MPX samples; and
 estimating a mean value of the plurality of MPX samples, wherein the mean value of the plurality of MPX samples is representative of the coarse frequency offset of the analog portion of the radio broadcast signal.

6. The method of claim 5 wherein estimating the mean value of the plurality of MPX samples includes passing the first plurality of MPX samples through an averaging filter.

7. The method of claim 1 wherein generating the error signal further comprises adding the coarse frequency offset of the analog portion of the radio broadcast signal to a fine frequency offset of the digital portion of the radio broadcast signal.

8. The method of claim 1 wherein adjusting the frequency of the digital portion of the radio broadcast signal with the error signal further comprises the steps of:
 generating a frequency correction signal from the error signal; and
 multiplying the frequency correction signal with a plurality of samples representative of the digital portion of the radio broadcast signal.

9. A system for correcting a frequency error in a digital portion of a radio broadcast signal comprising:
 a processing system; and
 a memory coupled to the processing system, wherein the processing system is configured to execute steps comprising:
  receiving a radio broadcast signal having an analog portion and a digital portion;
  separating the analog portion of the radio broadcast signal and the digital portion of the radio broadcast signal;
  determining a coarse frequency offset of the analog portion of the radio broadcast signal;
  generating an error signal for adjusting a frequency of the digital portion of the radio broadcast signal, wherein the error signal is based on the coarse frequency offset of the analog portion of the radio broadcast signal; and
  adjusting the frequency of the digital portion of the radio broadcast signal with the error signal that is based on the coarse frequency offset of the analog portion of the radio broadcast signal, such that a frequency error in the digital portion of the radio broadcast signal is reduced below a predetermined amount.

10. The system of claim 9 wherein the radio broadcast signal is an in-band-on-channel digital radio signal.

11. The system of claim 9 wherein the analog portion of the radio broadcast signal is a frequency modulated signal.

12. The system of claim 9 wherein the digital portion of the radio broadcast signal is an orthogonal frequency division multiplexed signal.

13. The system of claim 9 wherein determining the coarse frequency offset of the analog portion of the radio broadcast signal further comprises the steps of:
 demodulating a plurality of samples representative of the analog portion of the radio broadcast signal to generate a plurality of MPX samples; and
 estimating a mean value of the plurality of MPX samples, wherein the mean value of the plurality of MPX samples is representative of the coarse frequency offset of the analog portion of the radio broadcast signal.

14. The system of claim 13 wherein estimating the mean value of the plurality of MPX samples includes passing the first plurality of MPX samples through an averaging filter.

15. The system of claim 9 wherein generating the error signal further comprises adding the coarse frequency offset of the analog portion of the radio broadcast signal to a fine frequency offset of the digital portion of the radio broadcast signal.

16. The system of claim 9 wherein adjusting the frequency of the digital portion of the radio broadcast signal with the error signal further comprises the steps of:
 generating a frequency correction signal from the error signal; and
 multiplying the frequency correction signal with a plurality of samples representative of the digital portion of the radio broadcast signal.

17. A tangible computer readable storage medium comprising computer program instructions adapted to cause a processing system to execute steps comprising:
 receiving a radio broadcast signal having an analog portion and a digital portion;
 separating the analog portion of the radio broadcast signal and the digital portion of the radio broadcast signal;
 determining a coarse frequency offset of the analog portion of the radio broadcast signal;
 generating an error signal for adjusting a frequency of the digital portion of the radio broadcast signal, wherein the error signal is based on the coarse frequency offset of the analog portion of the radio broadcast signal; and adjusting the frequency of the digital portion of the radio broadcast signal with the error signal that is based on the coarse frequency offset of the analog portion of the radio broadcast signal, such that a frequency error in the digital portion of the radio broadcast signal is reduced below a predetermined amount.

18. The computer readable storage medium of claim 17 wherein the radio broadcast signal is an in-band-on-channel digital radio signal.

19. The computer readable storage medium of claim 17 wherein the analog portion of the radio broadcast signal is a frequency modulated signal.

20. The computer readable storage medium of claim 17 wherein the digital portion of the radio broadcast signal is an orthogonal frequency division multiplexed signal.

21. The computer readable storage medium of claim 17 wherein determining the coarse frequency offset of the analog portion of the radio broadcast signal further comprises the steps of:

demodulating a plurality of samples representative of the analog portion of the radio broadcast signal to generate a plurality of MPX samples; and estimating a mean value of the plurality of MPX samples, wherein the mean value of the plurality of MPX samples is representative of the coarse frequency offset of the analog portion of the radio broadcast signal.

22. The computer readable storage medium of claim 21 wherein estimating the mean value of the plurality of MPX samples includes passing the first plurality of MPX samples through an averaging filter.

23. The computer readable storage medium of claim 17 wherein generating the error signal further comprises adding the coarse frequency offset of the analog portion of the radio broadcast signal to a fine frequency offset of the digital portion of the radio broadcast signal.

24. The computer readable storage medium of claim 17 wherein adjusting the frequency of the digital portion of the radio broadcast signal with the error signal further comprises the steps of:

generating a frequency correction signal from the error signal; and multiplying the frequency correction signal with a plurality of samples representative of the digital portion of the radio broadcast signal.

* * * * *